United States Patent
Webber

(10) Patent No.: US 7,610,875 B2
(45) Date of Patent: Nov. 3, 2009

(54) COLLAPSIBLE BIRD FEEDER WITH A REMOVABLE TRAY

(75) Inventor: Bruce Randall Webber, Wheaton, IL (US)

(73) Assignee: Akerue Industries, Antioch, IL (US)

( * ) Notice: Subject to any disclaimer, the term of this patent is extended or adjusted under 35 U.S.C. 154(b) by 158 days.

(21) Appl. No.: 11/891,021

(22) Filed: Aug. 2, 2007

(65) Prior Publication Data
US 2009/0031962 A1 Feb. 5, 2009

(51) Int. Cl.
*A01K 39/01* (2006.01)
*A01K 39/02* (2006.01)

(52) U.S. Cl. .................................... 119/57.8; 119/72

(58) Field of Classification Search ............... 119/57.8, 119/57.9, 72, 52.2, 52.3, 61.1, 51.01, 63, 119/61.2, 61.3, 61.31
See application file for complete search history.

(56) References Cited

U.S. PATENT DOCUMENTS 2,866,435 A * 12/1958 Blazier ........................ 119/53
3,330,257 A * 7/1967 Warner, Sr. ................ 119/61.3
5,062,390 A * 11/1991 Bescherer et al. ............. 119/72
5,303,674 A * 4/1994 Hyde, Jr. ...................... 119/77
6,253,706 B1 * 7/2001 Sloop ......................... 119/57.9
2003/0226514 A1 * 12/2003 Cote .......................... 119/57.9
2008/0105206 A1 * 5/2008 Rich et al. ................. 119/57.9

* cited by examiner

*Primary Examiner*—Son T. Nguyen
(74) *Attorney, Agent, or Firm*—Justin Lampel

(57) ABSTRACT

The present invention generally relates to a bird feeder having a removable tray. The removable tray may be generally circular and may have an opening that wraps around a telescoping support section. Further, the removable tray may have a convex portion which acts to counter-balance the bird feeder. The removable tray is especially useful for cleaning and/or refilling the bird feeder. The bird feeder may be collapsed in a first position for storage or transportation or may be opened telescopically in a second position for use. The bird feeder may further have a perch to allow a bird to rest while visiting the bird feeder and/or may have a concave portion on the top surface which may be used to prevent insects or other animals from accessing the bird food.

9 Claims, 5 Drawing Sheets

COLLAPSIBLE BIRD FEEDER WITH A REMOVABLE TRAY

BACKGROUND OF THE INVENTION

The present invention generally relates to a bird feeder having a removable tray. The removable tray may be generally circular and may have an opening that wraps around a telescoping support section. Further, the removable tray may have a convex portion which acts to counter-balance the bird feeder. The removable tray is especially useful for cleaning and/or refilling the bird feeder. The bird feeder may be collapsed in a first position for storage or transportation or may be opened telescopically in a second position for use. The bird feeder may further have a perch to allow a bird to rest while visiting the bird feeder and/or may have a concave portion on the top surface which may be used to prevent insects or other animals from accessing the bird food.

It is common to find collapsible containers which are used to hold seed for wild animals. U.S. Pat. No. 7,032,538 to Lush discloses a collapsible feeder for birds, squirrels and the like comprising a plastic feeder body having a base and rim at the lower end thereof and a cover selectively closing the upper end thereof. The feeder body has a plurality of collapsible corrugations defining annular members that allow the body to extend and contract into extended and collapsed positions. The lower end of the feeder body is provided with feed outlets to enable feed within the feeder body to pass outwardly there through onto the base inwardly of the rim. The feeder body may also have a plurality of small openings or feeding stations formed in the corrugations to enable birds or the like to gain access to the feed within the feeder body. Preferably, the feeder body defines an inverted frusto-conical shape, but may have a frusto-conical shape as well as other shapes.

U.S. Pat. No. 5,454,348 to Colwell et al. discloses a hummingbird feeder having a top wall and a bottom wall, the top and bottom walls being joined at their peripheries to define an enclosure constituting a reservoir. A feeding station is positioned in the top wall, the feeding station comprising a feed opening in the top wall. A cleaning opening is provided in the top wall. The cleaning opening is of sufficient size for enabling the cleaning of the reservoir. A cap selectively covers the cleaning opening, the cap being movable for exposing the cleaning opening when it is desired to clean the reservoir. In another embodiment, an upwardly extending boss formed in the bottom wall has a downwardly opening bore adapted to receive therein a member for mounting the feeder in an upright position. Alternatively, a hook adapter having a hook for hanging articles from the feeder is threadably attached to the bottom wall.

U.S. Pat. No. 6,739,284 to Olive discloses a hummingbird feeder having a two-part housing and a vessel unit supported by the housing. The vessel unit may be prefilled with a sugar and water solution. Once the sugar and water solution has been emptied from the vessel unit, the two housing pieces may be separated, the empty vessel unit removed, and a full new vessel unit placed inside the housing. Alternatively, the vessel unit may be refilled.

A common problem with bird feeders, especially hummingbird bird feeders, is that the nectar placed in the bird feeder begins to spoil after around three or four days. As a result, the owner of the bird feeder must often take the entire bird feeder down to clean the spoiled nectar and refill the bird feeder with fresh nectar, or other food. If the bird feeder is a hummingbird bird feeder, the owner usually must clean the nectar with special brushes which can reach into the small openings which the birds use to access the nectar. These openings are usually small so as to reduce the likelihood of unwanted animals or insects from accessing the nectar. Once the bird feeder is cleaned and refilled, the owner must re-hang the bird feeder. This process is difficult and time consuming.

Further, these bird feeders fail to provide the features of the present invention. More specifically, these existing bird feeders do not allow a user to hang the bird feeder once without having to remove the entire bird feeder for cleaning and refilling. Further, these bird feeders are often difficult to clean and refill.

A need, therefore, exists for an improved bird feeder which is easy to clean and refill. Further, a need exists for an improved bird feeder in which the body of the bird feeder may be permanently hung from a tree or other object. Finally, a need exists for an improved bird feeder which may be easily stored and/or transported in a collapsed position.

SUMMARY OF THE INVENTION

The present invention generally relates to a bird feeder having a removable tray. The removable tray may be generally circular and may have an opening that wraps around a telescoping support section. Further, the removable tray may have a convex portion which acts to counter-balance the bird feeder. The removable tray is especially useful for cleaning and/or refilling the bird feeder. The bird feeder may be collapsed in a first position for storage or transportation or may be opened telescopically in a second position for use. The bird feeder may further have a perch to allow a bird to rest while visiting the bird feeder and/or may have a concave portion on the top surface which may be used to prevent insects or other animals from accessing the bird food.

An advantage of the present invention is to provide a bird feeder which may telescopically collapse from a second position to a first position for storage and/or transportation.

An advantage of the present invention is to provide a bird feeder which is easily cleaned and refilled.

Another advantage of the present invention is to provide a bird feeder which has a removable tray.

A further advantage of the present invention is to provide a bird feeder which has an opaque or tinted top section to prevent sunlight from damaging nectar placed in the bird feeder.

Yet another advantage of the present invention is to provide a bird feeder having a 360 degree perch for birds to rest on.

Another advantage of the present invention is to provide a bird feeder which has a concave portion which prevents unwanted insects or other animals from accessing the food source in the bird feeder.

For a more complete understanding of the above listed features and advantages of the present bird feeder, reference should be made to the following detailed description of the preferred embodiments and to the accompanying drawings. Further, additional features and advantages of the present invention are described in, and will be apparent from, the detailed description of the preferred embodiments and from the drawings.

DETAILED DESCRIPTION OF THE PREFERRED EMBODIMENTS

The present invention generally relates to a bird feeder having a removable tray. The removable tray may be generally circular and may have an opening that wraps around a telescoping support section. Further, the removable tray may have a convex portion which acts to counter-balance the bird feeder. The removable tray is especially useful for cleaning and/or refilling the bird feeder. The bird feeder may be collapsed in a first position for storage or transportation or may be opened telescopically in a second position for use. The bird feeder may further have a perch to allow a bird to rest while visiting the bird feeder and/or may have a concave portion on the top surface which may be used to prevent insects or other animals from accessing the bird food.

Figure 1:
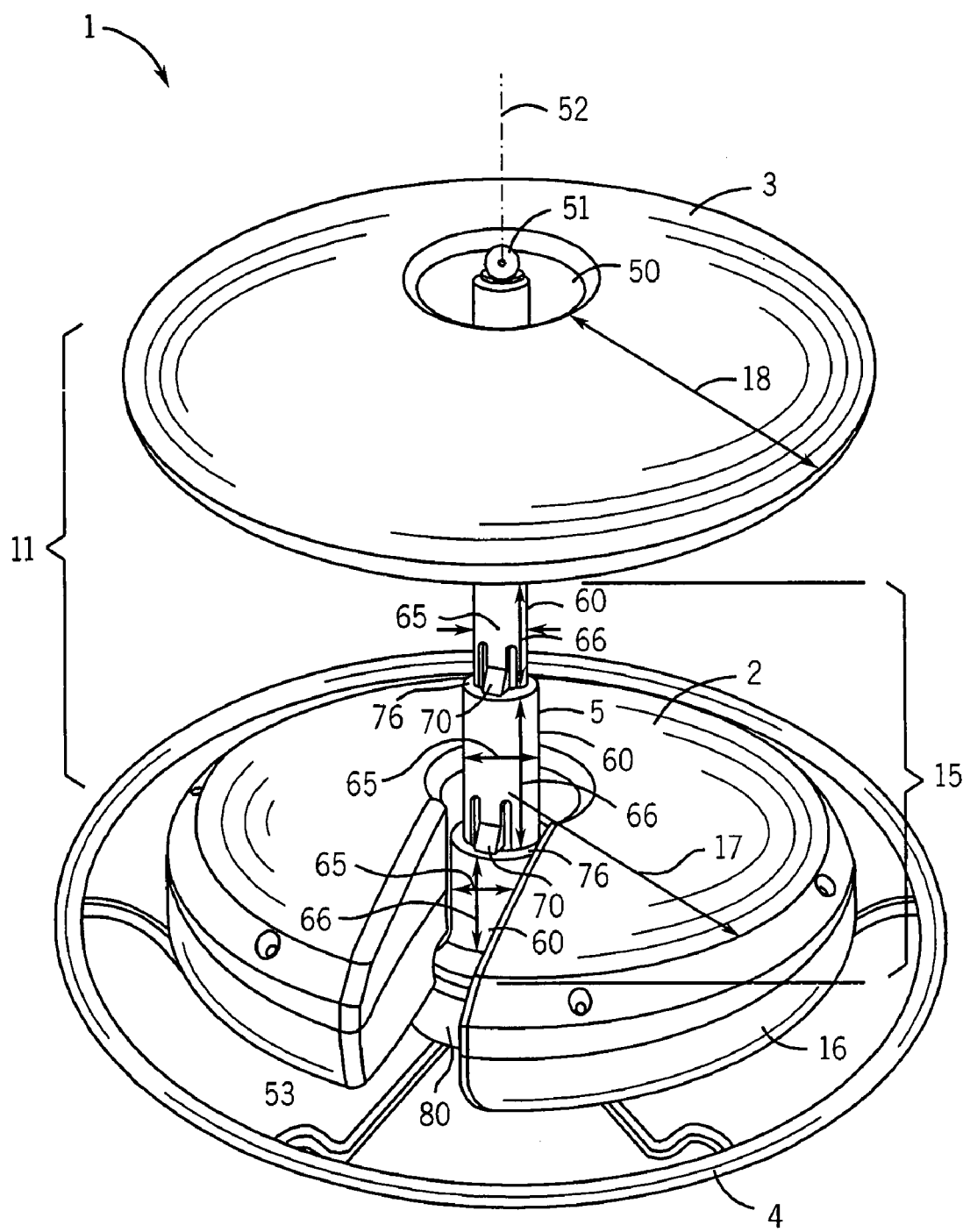
FIG. 1 illustrates a front perspective view of a bird feeder of the present invention wherein the bird feeder is in an open second position.

Referring now to the drawings wherein like numerals refer to like parts, FIG. 1 generally illustrates a bird feeder 1 having a removable tray 2. The bird feeder 1 is particularly suitable for hummingbirds. The removable tray 2 is particularly suitable for easily removing, cleaning and refilling.

The bird feeder 1 may have a top section 3, a bottom section 4 and a middle section 5. The top section 3 may be generally circular and convex with respect to the bottom section 4. The top section 3 may be connected to the bottom section 4 by, for example, a telescoping support section 5. The telescoping support section 5 may allow the bird feeder 1 to be collapsed in a first position for shipping and/or storage or may allow the bird feeder 1 to be telescopically opened in a second position for use.

The bird feeder 1 may be constructed from, for example, plastic or any other suitable material. Further, the bird feeder 1 may be scented so as to attract a certain type of bird or to repel certain birds and/or other animals or insects. Preferably, the bird feeder 1 is constructed from a material that can be easily cleaned and that is strong and sturdy enough to resist most outdoor weather conditions. The bird feeder 1 illustrated in FIG. 1 is circular, however, the bird feeder 1 may be formed in any suitable shape.

The top section 3 of the bird feeder 1 may be generally in the shape of, for example, a circle. When the bird feeder 1 is in an expanded second position 11 (the useable position) the top section 3 may provide the bird food with protection from the sun and weather and may further provide a barrier against unwanted animals accessing the food in the bird feeder 1. In addition, the top section 3 is preferably tinted or opaque so as to prevent the sun from spoiling the nectar, or other bird food placed in the bird feeder.

The top section 3 of the bird feeder 1 may be generally convex with respect to the remainder of the bird feeder 1. However, the top section 3 may have a generally circular concave portion 50 wherein a hanging portion 51 is located in the center of the concave portion 50. The hanging portion 51 may be, for example, a hook, a loop or the like. A string or wire 52 may be used to hang the bird feeder 1 from the hanging portion 51 to, for example, a tree. The concave portion 50 may act as a moat and prevent, for example, insects from descending down the string 52, onto the top section 3 of the bird feeder 1 and then down to a food source 53. To prevent unwanted creatures from accessing the food source, the user may allow rainfall to collect in the concave portion 50 or the user may manually fill the concave portion 50 with, for example, water or oil, so as to reduce the chance of insects accessing the food source.

The telescoping support section 5 of the bird feeder 1 may have a plurality of units 60. The figures illustrate the telescoping support section having three units 60, however, the telescoping support section 5 may have any number of units 60. The units 60 of the telescoping support section 5 may be interconnected so that the length of the telescoping support section 5 may be changed. The units 60 of the telescoping support section 5 may be generally in the shape of cylindrical hollow tubes.

Figure 2:
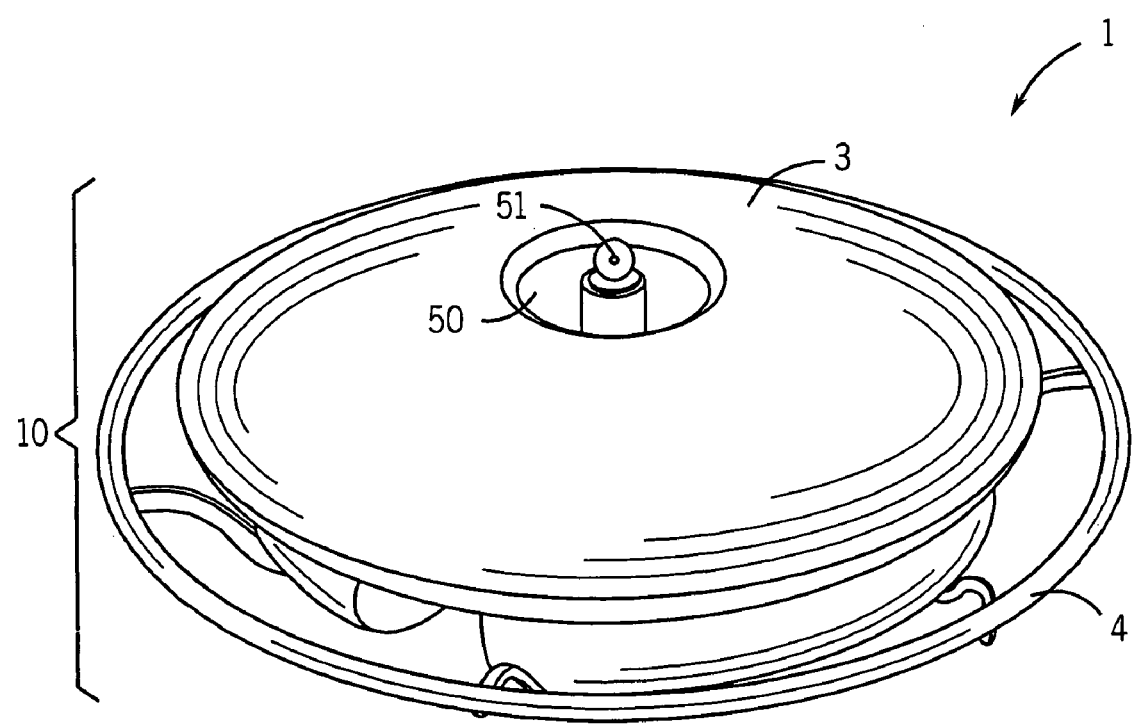
FIG. 2 illustrates a front perspective view of a bird feeder of the present invention wherein the bird feeder is in a closed first position.
Figure 3:
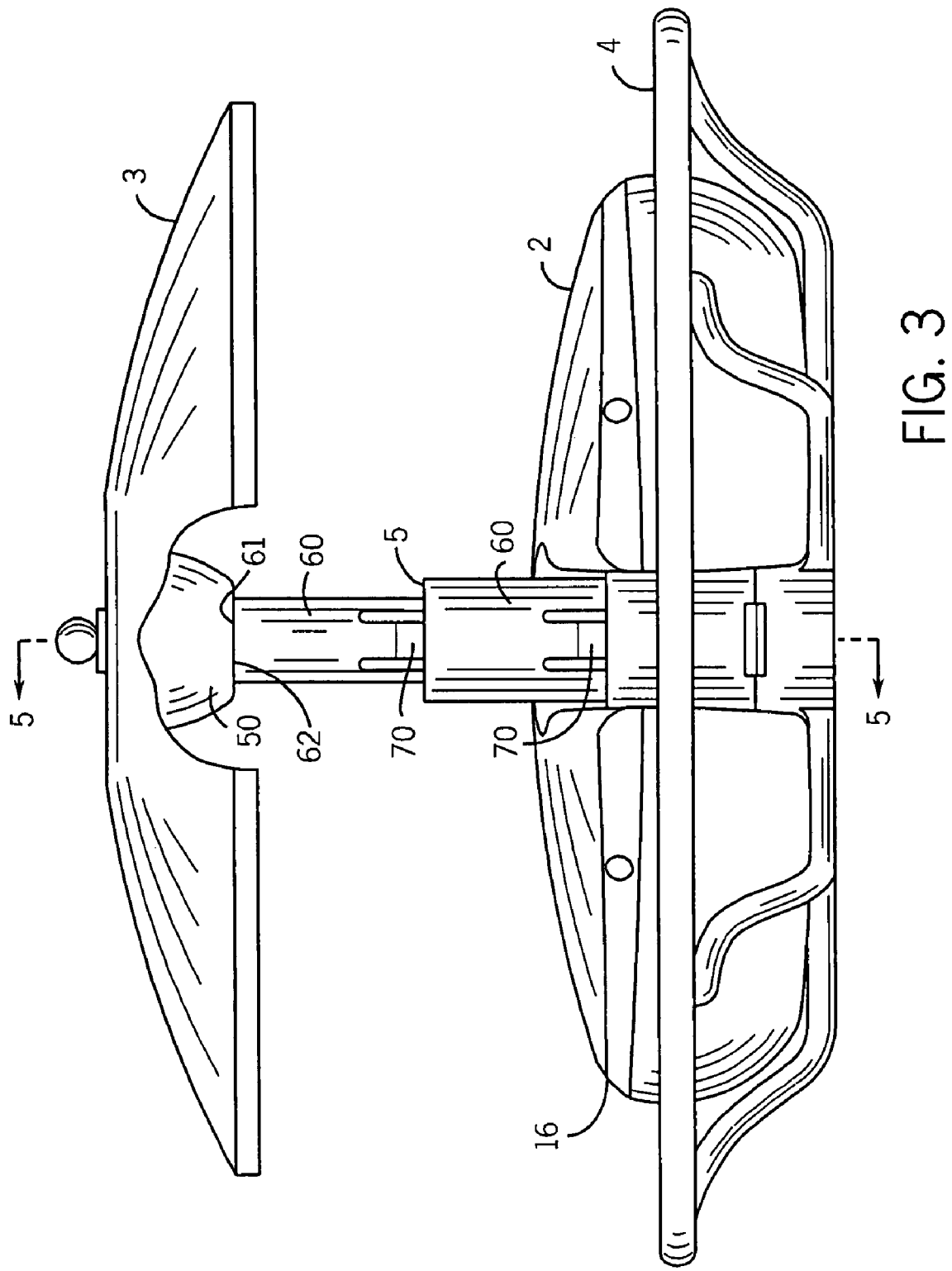
FIG. 3 illustrates a side plan view of the top section and middle section of the present invention.

The telescoping support section 5, and therefore the bird feeder 1, may have a first position 10 (See FIG. 2) and a second position 11 (FIG. 1). The first position 10 may be a generally collapsed position and the second position 11 may be the generally usable position for feeding birds. Although, the bird feeder 1 is particularly suitable for use with humming birds, the bird feeder 1 may be used for feeding numerous other types of bird or even numerous other types of animal.

The top end 61 of the top unit 60 of the telescoping support section 5 may be secured to the bottom side 62 of the concave portion 50 of the top section 3. When the telescoping support section 5 is in the usable second position 11, a middle section 15 of the bird feeder 1 may be exposed. The middle section 15 of the bird feeder 1 may have a removable tray section 16. The removable tray section 16 may have a diameter 17 which may be smaller than a diameter 18 of the top section 3 and the bottom section 4 of the bird feeder 1. More specifically, the removable tray section 16 may have a diameter 17 which may be smaller than a diameter 18 of the top section 3 and the bottom section 4 of the bird feeder 1 so as to allow the removable tray section 16 to be placed substantially within the middle section 15 of the bird feeder 1 when the bird feeder 1 is in the closed first position 10.

As stated above, the middle section 15 of the bird feeder 1 may have the telescoping support section 5. FIG. 1 illustrates the telescoping support section 5 having three units 60, however, the telescoping support section 5 may have any number of units 60. The each of the units 60 of the telescoping support section 5 may have a diameter 65 and a height 66. The diameter 65 of each of the units 60 may become increasingly larger with respect to the preceding unit 60 the closer to the to the bottom section 4 of the bird feeder 1 that unit 60 is located (as illustrated in FIG. 1). In an alternative embodiment, the unit 60 with the largest diameter 65 may be located near the top section 3 of the bird feeder 1. Each of the units 60 of the telescoping support section 5 may have at least one tab 70 which extends beyond the circumference of that unit 60. When the units 60 of the telescoping support section 5 are extended so that the bird feeder 1 is in the useable second condition, the tab 70 of each of the units 60 may at least partially rest on a top edge 76 of the unit 60 directly underneath that unit 60. The bottom unit 60 of the telescoping support section 5 may lack a tab 70. Instead, the bottom unit 60 of the telescoping support section 5 may be permanently secured to a gene rally circular base 80.

To collapse the telescoping support section 5 to, for example, store and or transport the bird feeder 1, the user may press the tab 70 inward toward the center of each of the units 60. As a result, the outward most portion of the tabs 70 may extend inward past the circumference of each unit 60, thereby allowing the unit 60 to slide within the adjacent unit 60 having a larger diameter 65. In the collapsed, unusable position of the bird feeder 1, multiple units 60 of the telescoping support section 5 may be located within a single unit 60.

Figure 4:
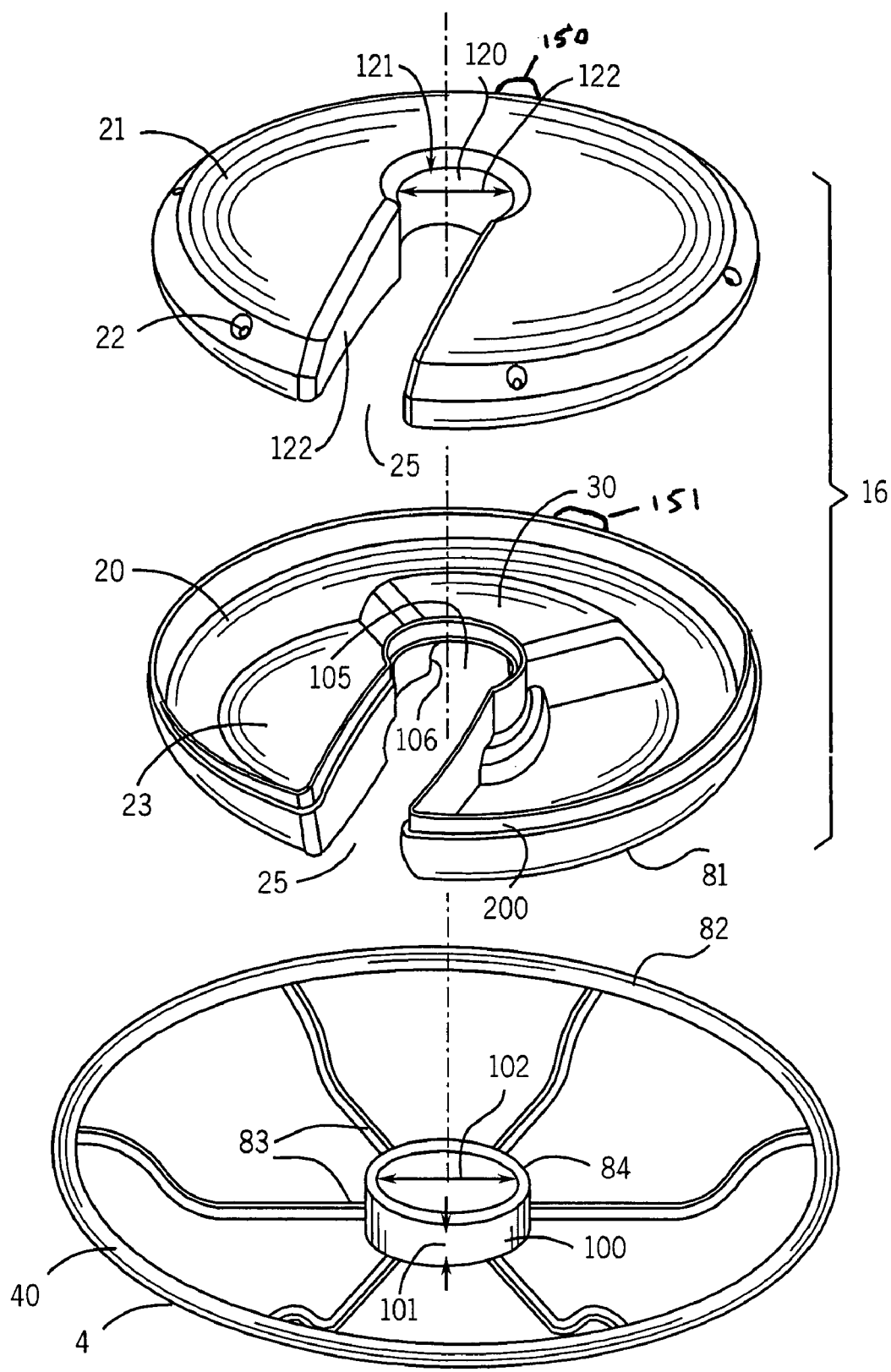
FIG. 4 illustrates an exploded view of the removable tray section and the bottom section of the present invention.
Figure 5:
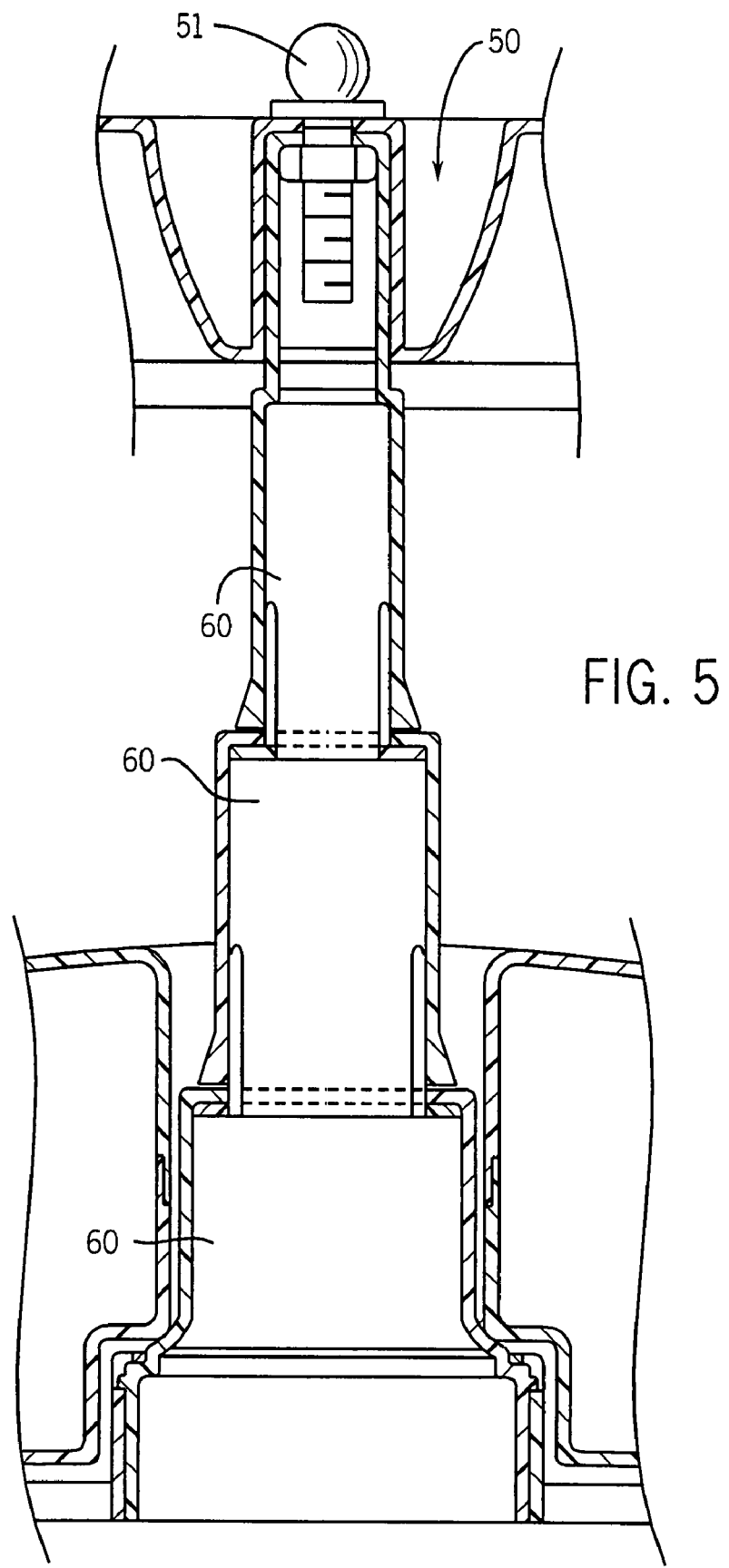
FIG. 5 illustrates a side view of the units of the present invention in the expanded position.

Referring now to FIG. 4, the removable tray section 16 may have a bottom pan 20 and a corresponding lid 21. The lid 21 of the removable tray section 16 may have a plurality of holes 22 so as to allow a bird to reach food 23 placed in the bottom pan 20. The lid 21 may prevent food 23 from, for example, falling out of the bottom pan 20 spoiling, and further may prevent unwanted animals form obtaining access to the food 23. Still further, the lid 21 may prevent the food 23 in the bottom pan 20 from being consumed too quickly. Preferably, the corresponding lid 21 is tinted or opaque so as prevent the sun from spoiling the nectar, or other food, located in the removable tray section 16.

The bottom side 81 of the removable tray section 16 may rest on a top side 82 of the bottom section 4 of the bird feeder 1. The bottom section 4 of the bird feeder 1 may be generally solid or may be composed of a series of spokes 83 extending outward from a center 84 of the bottom section 4. FIG. 4 illustrates the bird feeder 1 having six spokes 83, however, the bird feeder 1 may have any number of spokes 83. The center portion 84 of the bottom section 4 may have a generally circular base 100 having a height 101 and a diameter 102. The bottom pan 20 may have a corresponding recessed area 105 which rests on the generally circular base 100. The corresponding recessed area 105 may have a height 106 which is substantially similar to the height 101 of the generally circular base 100. As a result, the corresponding recessed area 105 of the bottom pan 20 may rest on a portion of the generally circular base 100. Preferably, the removable tray section 16 is generally circular so as to make the cleaning of the removable tray easier.

The bottom pan 20 and the corresponding lid 21 may be generally circular in shape, but may have an opening 25 which may allow the user to slide the removable tray section 16 around the telescoping support section 5. The bottom pan 20 may have a raised generally convex portion 30 directly, or nearly directly, opposite the opening 25. As a result, the generally convex portion 30 may counterbalance the lack of weight in the opening section 25 so that the bird feeder 1 hangs in a generally balanced manner no matter how much, if any, food 23 is stored in the bottom pan 20. As a result of the generally convex portion 30, no food 23 may accumulate in the generally convex portion 30 area of the bottom pan 20 and, therefore, the lack of food 23 in that area counterbalances the lack of food 23 a the slot portion 122 of the bottom pan 20, as discussed below.

The removable tray section 16 of the bird feeder 1 may have a center 120 having an opening 121. The opening 121 may be generally circular, with a slot portion 122 extending outward. Further, the generally circular opening 121 may have a diameter 122. The diameter 122 of the generally circular opening 121 may be slightly larger than the diameter 102 of the circular base 100 and the diameter 65 of the units 60 of the bird feeder 1. More specifically, the user may slide the removable tray section 16 around the generally circular base 100 and the bottom unit 60, by means of the slot portion 122. The removable tray section 16 may then rest in the useable position with the opening 121 of the removable tray section 16 largely surrounding the circular base 100 and the bottom most unit 60.

The corresponding lid 21 of the bird feeder 1 may be removed from the bottom pan 20 to, for example, clean and/or refill the bottom pan 20 with food 23. The corresponding lid 21 may be secured to the bottom pan 20 by means of in interlocking lip 200 which may hold the corresponding lid 21 on top of the bottom pan 20 by, for example, friction and/or gravity. The lid 21 of the removable tray section 16 may have a tab 150. Further, the bottom pan 20 of the removable tray section 16 may have a tab 151. Both the first tab 150 and the second tab 151 of the removable tray section 16 may allow the user the easily separate the bottom pan 20 from the corresponding lid 21 to, for example, clean and/or refill the removable tray section 16.

The tab 151 of the bottom pan 20 may be located near the tab 150 of the corresponding lid 21 so that the user may apply opposing forces to the two tabs to easily separate the bottom pan 20 from the corresponding lid 21 to, for example, clean and/or refill the bird feeder 1. When the bottom pan 20 and the corresponding lid 21 are secured together, the removable tray section 16 is largely leak-proof, except for the openings 22 in which the birds access the food.

In an embodiment, the bottom pan 20 may be transparent so as to allow the user to visually determine the level of food 23 in the bird feeder 1 without the need to open the removable tray section 16 and possibly disturb any birds. If birdseed is used in place of nectar, the user may simply place birdseed inside the bottom pan 20 and place the bottom pan 20 in the bird feeder 1 without using the corresponding lid 21 of the removable tray section 16.

The outward most portion of the bottom section 4 of the bird feeder 1 may be used as a perch section 40 which may allow a bird to stand on while accessing food 23 in the bird feeder 1. As a result, a bird may utilize the 360 degree perch 40 to access bird food from almost any position on the bottom section 4.

Finally, the bird feeder 1 may have additional features such as, for example, a light for night viewing of the birds or an alarm if a large animal attempts to access the food source.

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A birdfeeder comprising:
   a top section;
   a bottom section;
   a support shaft connecting the top section to the bottom section;
   a feeding tray having a side wherein the feeding tray is located between the top section and the bottom section and wherein the feeding tray is removable from the birdfeeder;
   an opening along the side of the feeding tray wherein the feeding tray is inserted into the birdfeeder and around the support shaft via the opening on the side;
   a convex section on the feeding tray substantially opposite the opening on the side of the feeding tray wherein the convex section distributes and balances the feeding tray and contents of the feeding tray around the support shaft; and
   a collapsible support section wherein the collapsible support section moves from a first position to a second position.

2. The birdfeeder of claim 1 further comprising:
   a tab located on a top section of the feeding tray; and a tab located on a bottom section of the feeding tray wherein the tab of the top section is adjacent to the tab of the bottom section and wherein the tabs are used to open the feeding tray.

3. The birdfeeder of claim 2 further comprising:

a plurality of openings on the top section of the feeding tray wherein the openings allow a specific types of birds to access food located within the feeding tray.

4. The birdfeeder of claim 1 further comprising:

a perch located around the bottom section.

5. The birdfeeder of claim 1 further comprising:

a tab located on the collapsible support section wherein the tab may locks the collapsible support section in a second position from a first position.

6. The birdfeeder of claim 1 further comprising:

a concave portion located at a center of the top section wherein the concave portion holds a liquid.

7. The birdfeeder of claim 1 wherein the collapsible support section telescopically collapses.

8. The birdfeeder of claim 1 wherein the birdfeeder is tinted or opaque.

9. The birdfeeder of claim 1 wherein the birdfeeder is scented.

* * * * *